(12) United States Patent
Lin et al.

(10) Patent No.: US 11,148,678 B2
(45) Date of Patent: Oct. 19, 2021

(54) CONTROLLING OPERATION OF A VEHICLE WITH A SUPERVISORY CONTROL MODULE HAVING A FAULT-TOLERANT CONTROLLER

(71) Applicant: GM Global Technology Operations LLC, Detroit, MI (US)

(72) Inventors: Wen-Chiao Lin, Rochester Hills, MI (US); Xinyu Du, Oakland Township, MI (US); Xiaoyu Huang, Troy, MI (US); Paul E. Krajewski, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 305 days.

(21) Appl. No.: 16/395,825

(22) Filed: Apr. 26, 2019

(65) Prior Publication Data
US 2020/0339140 A1  Oct. 29, 2020

(51) Int. Cl.
*B60W 50/029* (2012.01)
*B60W 50/02* (2012.01)
(Continued)

(52) U.S. Cl.
CPC .......... *B60W 50/029* (2013.01); *B60W 10/18* (2013.01); *B60W 10/20* (2013.01); *B60W 50/0205* (2013.01); *B60W 2050/0031* (2013.01); *B60W 2050/0215* (2013.01); *B60W 2050/0297* (2013.01); *B60W 2420/42* (2013.01); *B60W 2520/14* (2013.01); *B60W 2520/28* (2013.01); *B60W 2530/20* (2013.01)

(58) Field of Classification Search
CPC ...... B60W 10/04; B60W 10/18; B60W 10/20; B60W 2050/0031; B60W 2050/0215; B60W 2050/0297; B60W 2420/42; B60W 2520/14; B60W 2520/28; B60W 2530/20; B60W 50/0205; B60W 50/029; B60W 60/005
See application file for complete search history.

(56) References Cited

U.S. PATENT DOCUMENTS 5,393,278 A * 2/1995 Kyushima ............. B60W 10/06
477/118
5,912,539 A * 6/1999 Sugitani ................. B62D 5/049
318/434

(Continued)

*Primary Examiner* — Babar Sarwar
(74) *Attorney, Agent, or Firm* — Quinn IP Law

(57) ABSTRACT

System and method for controlling operation of a vehicle in real-time with a supervisory control module. A fault detection module is configured to receive respective sensor data from one or more sensors in communication with the vehicle and generate fault data. The supervisory control module includes at least one fault-tolerant controller configured to respond to a plurality of faults. The supervisory control module is configured to receive the fault data. When at least one fault is detected from the plurality of faults, the supervisory control module is configured to employ the fault-tolerant controller to generate at least one selected command. The selected command is transmitted to one or more device controllers for delivery to at least one of the respective components of the vehicle. Operation of the vehicle is controlled based in part on the selected command.

18 Claims, 3 Drawing Sheets

(51) Int. Cl.
*B60W 10/20* (2006.01)
*B60W 10/18* (2012.01)
*B60W 50/00* (2006.01)

(56) References Cited

U.S. PATENT DOCUMENTS

| | | | | |
|---|---|---|---|---|
| 5,957,985 | A * | 9/1999 | Wong | G06F 11/2035 701/29.2 |
| 7,877,177 | B2 * | 1/2011 | Kueperkoch | B60T 8/885 701/30.3 |
| 8,116,934 | B2 * | 2/2012 | Ishikawa | G07C 5/008 701/31.8 |
| 8,204,647 | B2 * | 6/2012 | Nakane | B62D 5/049 701/31.7 |
| 8,634,986 | B2 * | 1/2014 | Ghoneim | B62D 5/0481 701/32.9 |
| 8,645,022 | B2 * | 2/2014 | Yoshimura | B60W 50/0225 701/32.8 |
| 9,751,556 | B1 | 9/2017 | Lin et al. | |
| 2004/0181329 | A1 * | 9/2004 | Tseng | B60T 8/885 701/38 |
| 2004/0236491 | A1 * | 11/2004 | Seto | B60T 7/22 701/96 |
| 2005/0264248 | A1 * | 12/2005 | Tsunoda | B62D 5/0493 318/434 |
| 2008/0059018 | A1 * | 3/2008 | Kueperkoch | B60G 17/0185 701/30.3 |
| 2008/0189009 | A1 * | 8/2008 | Wang | G01R 31/007 701/31.1 |
| 2011/0307196 | A1 * | 12/2011 | Schumacher | G01R 31/52 702/58 |
| 2015/0012166 | A1 * | 1/2015 | Hauler | B60W 30/0956 701/23 |
| 2016/0159347 | A1 * | 6/2016 | Lavoie | B60W 30/10 701/41 |
| 2018/0115269 | A1 | 4/2018 | Lin et al. | |
| 2018/0370519 | A1 | 12/2018 | Yen et al. | |
| 2019/0079513 | A1 * | 3/2019 | Greenfield | G06F 11/2038 |
| 2019/0126918 | A1 * | 5/2019 | Takayanagi | B60W 50/14 |
| 2019/0137287 | A1 * | 5/2019 | Pazhayampallil | G01C 21/32 |
| 2020/0079393 | A1 * | 3/2020 | Hasegawa | G05D 1/0061 |
| 2020/0309852 | A1 * | 10/2020 | Lu | G01R 31/3187 |

* cited by examiner

CONTROLLING OPERATION OF A VEHICLE WITH A SUPERVISORY CONTROL MODULE HAVING A FAULT-TOLERANT CONTROLLER

INTRODUCTION

The present disclosure relates to a system and method for controlling operation of a vehicle with a supervisory control module having at least one fault-tolerant controller. A mobile platform may include modules for detecting faults in different components of the mobile platform, prior to or after the occurrence of the fault. Once a fault has occurred, it is challenging to mitigate its effects while continuing to optimize various other objectives. This is due to a number of reasons, such as for example, the increasing complexity of many mobile platforms.

SUMMARY

Disclosed herein is a system and method for controlling operation of a vehicle in real-time. The system includes one or more sensors operatively connected to the vehicle and configured to generate respective sensor data. A fault detection module is configured to receive the respective sensor data and generate fault data. The system includes one or more device controllers configured to send respective command signals to respective components of the vehicle. A supervisory control module is in communication with the at least one device controller and has at least one fault-tolerant controller configured to respond to a plurality of faults.

The supervisory control module includes a processor and tangible, non-transitory memory on which instructions are recorded. Execution of the instructions by the processor causes the supervisory control module to: receive the fault data and determine if at least one fault from the plurality of faults is detected. When at least one fault is detected from the plurality of faults, the supervisory control module is configured to employ the fault-tolerant controller to generate at least one selected command. The selected command is transmitted to the device controller for delivery to at least one of the respective components of the vehicle. Operation of the vehicle is controlled based in part on the selected command.

The plurality of sensors may include an inertial measurement unit, an imaging unit, a global positioning unit, a tire pressure sensor and a wheel speed sensor. The respective components may include at least one tire, at least one wheel, a brake unit, an accelerator unit and a steering unit. The plurality of faults may include a respective loss of function of the at least one tire, the at least one wheel, the brake unit, the accelerator unit and the steering unit. The selected command may include at least two of a steering control command defining a steering angle and a steering rate configured to keep the vehicle in a predefined trajectory, an accelerate command configured to increase a speed of the vehicle and a brake command configured to slow the vehicle.

The supervisory control module may be programmed to prompt a user of the vehicle to take over control of the operation of the vehicle within a predefined time period after the at least one fault is detected. The vehicle may include a takeover function pre-programmed to accept or decline a takeover of the operation of the vehicle by a user. The supervisory control module may be programmed to enable transition to the takeover by the user when the at least one fault is detected and the takeover function is pre-programmed to accept the takeover.

The fault-tolerant controller may be a model-based controller at least partially characterized by a first dynamic equation ($I\ddot{\psi}=N+B$), and a second dynamic equation ($a\psi+\dot{\psi}=0$). Here N is a torque acting on the vehicle due an interaction with a road surface, B is a differential braking control input, $\psi$ is a yaw of the vehicle, $\dot{\psi}$ is a yaw rate, $\ddot{\psi}$ is a rate of change of the yaw rate, I is a moment of inertia of the vehicle and a is a positive parameter. The selected command may include a first brake pressure command ($BP_1$) and a second brake pressure command ($BP_2$), the differential braking control input being a difference between the first brake pressure command ($BP_1$) and the second brake pressure command ($BP_2$).

The fault-tolerant controller may include a model-based controller, a heuristics-based controller, a reinforcement-learning controller and a machine-learning controller. The fault-tolerant controllers may be configured to respond to the plurality of faults by a respective process. The selected command may be a weighted average of a respective output of the model-based controller, the heuristics-based controller, the reinforcement-learning controller and the machine-learning controller. The heuristics-based controller may be at least partially characterized by a membership function configured to map each point in an input space to a respective membership value between 0 and 1, the input space being at least one of a steering angle, a steering rate and a speed of the vehicle.

The reinforcement-learning may be at least partially characterized by an action-value function Q(a,s), where a is an available action for the vehicle, s is an observed state of the vehicle and the action-value function Q(a,s) indicates an estimated value of the available action a considering or based in part on a potential sequence of events (which may include subsequent actions and device reactions) occurring after the available action a is taken. The fault-tolerant controller may be configured (designed, numerically trained or otherwise adapted) to respond to the plurality of faults by respective processes. The machine-learning controller may be at least partially characterized by a numerical model generated by collecting user behavior data and vehicle dynamics data with an expert user driving the vehicle with the at least fault. The numerical model is derived with the vehicle dynamics data being an input to the numerical model and the user behavior data being an output to the numerical model.

The above features and advantages and other features and advantages of the present disclosure are readily apparent from the following detailed description of the best modes for carrying out the disclosure when taken in connection with the accompanying drawings.

DETAILED DESCRIPTION

Figure 1:
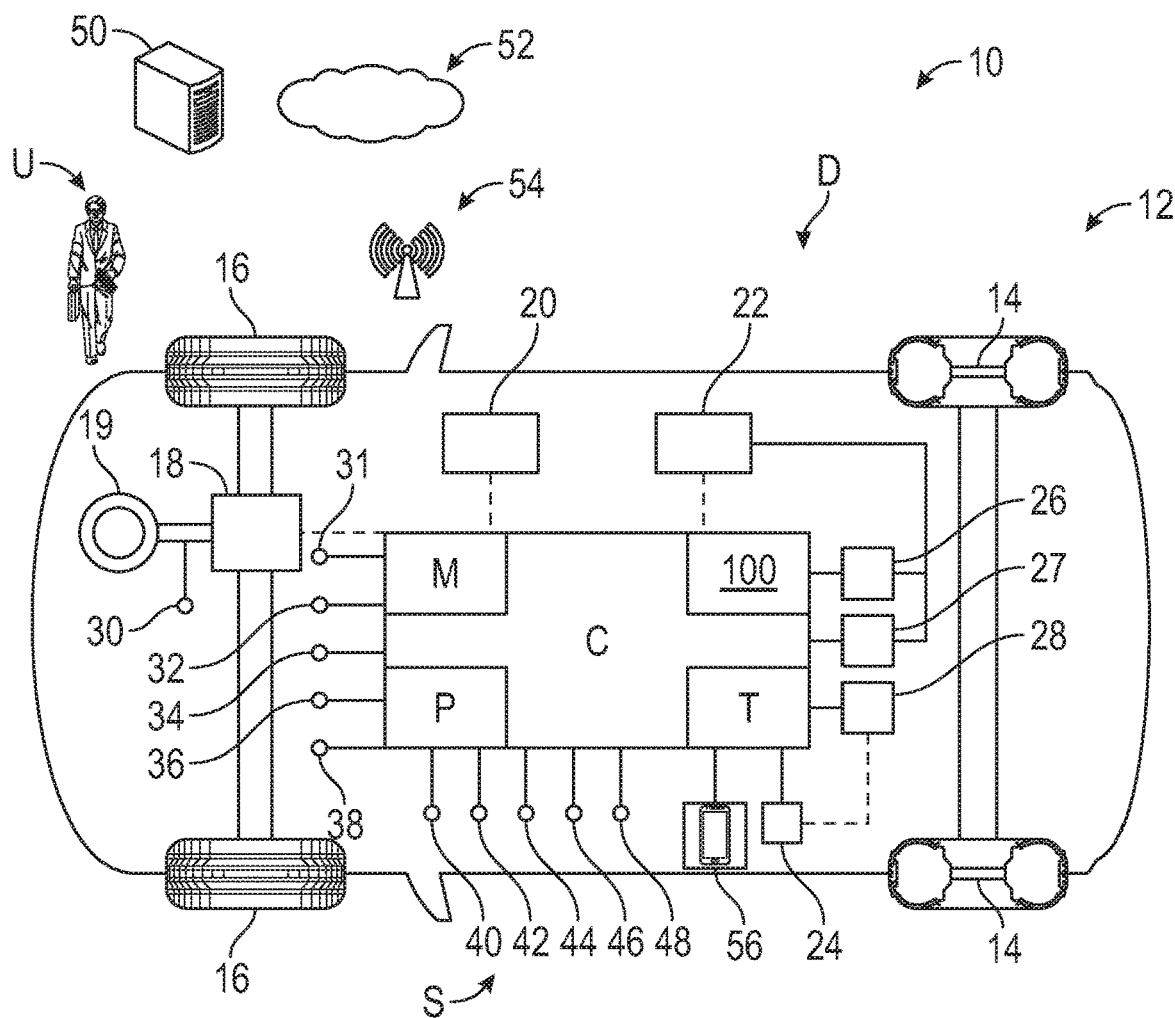
FIG. 1 is a schematic diagram of a system for controlling operation of a vehicle, the vehicle having a control center and a supervisory control module with at least one fault-tolerant controller.

Referring to the drawings, wherein like reference numbers refer to like components, FIG. 1 schematically illustrates a system 10 for controlling operation of a vehicle 12 in real-time. Referring to FIG. 1, the vehicle 12 may be rendered mobile with the aid of one or more wheels 14, which may be attached to one or more tires 16. Referring to FIG. 1, the vehicle 12 may be an autonomous vehicle or it may be driven at least partially with the assistance of a user U. The vehicle 12 may be a mobile platform such as, but not limited to, a passenger car, sport utility car, light truck, heavy duty truck, all-terrain vehicle, minivan, bus, transit vehicle (e.g. subway), bicycle, robot, farm implement (e.g. tractor), sports-related equipment (e.g. golf cart), boat, airplane and train. The vehicle 12 may take many different forms and include multiple and/or alternate components and facilities.

Referring to FIG. 1, the vehicle 12 includes one or more device controllers D configured to send respective command signals to various components of the vehicle 12. The device controllers D may include, but are not limited to, steering controller 18, a suspension controller 20, a brake controller 22 and a propulsion controller 24. The steering controller 18 may steer the vehicle 12 via a respective command signal to a steering unit 19. Referring to FIG. 1, the brake controller 22 may be configured to send respective command signals to a first brake unit 26 (e.g. left brake) and a second brake unit 27 (e.g. right brake). Alternatively, the vehicle 12 may include a single brake unit. The propulsion controller 24 may be configured to send a respective command signal to an accelerator unit 28. The vehicle 12 may be propelled by a propulsion source (not shown), which may be an internal combustion engine, an electric motor or a combination of both.

Referring to FIG. 1, the vehicle 12 includes a control center C in communication with the device controllers D. The device controllers D may be embedded in the control center C or otherwise in communication with the control center C without being embedded. The control center C includes at least one central processor P and at least one central memory M (or non-transitory, tangible computer readable storage medium). The communication and control between the various components shown in FIG. 1 may be done with cabling or wirelessly. Referring to FIG. 1, the control center C may include a takeover function T pre-programmed to accept or decline a takeover of the operation of the vehicle 12 by the user U. The pre-programming of the takeover function T may be set by the user U or a manufacturer.

Figure 2:
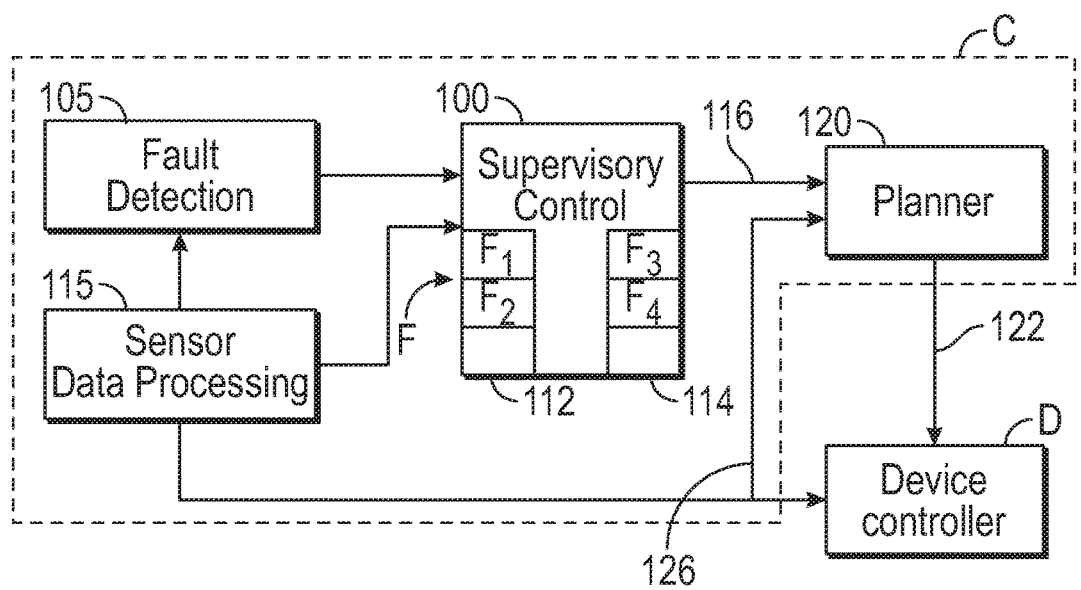
FIG. 2 is an example structure for the control center of FIG. 1.

Referring to FIG. 1, the vehicle 12 includes a supervisory control module 100 in communication with at least one of the device controllers D. The supervisory control module 100 of FIG. 1 may be an integral portion of, or a separate module operatively connected to, the control center C. An example structure for the control center C is shown and described below with reference to FIG. 2. Referring to FIG. 2, the supervisory control module 100 includes at least one fault-tolerant controller F configured to respond to a plurality of faults.

Referring to FIG. 2, the supervisory control module 100 includes at least one processor 112 and at least one memory 114 (or non-transitory, tangible computer readable storage medium) on which instructions are recorded for executing method 200 (described in detail below with respect to FIG. 3) for controlling operation of the vehicle 12, based at least partially on the fault-tolerant controller F. The memory 114 can store controller-executable instruction sets, and the processor 112 can execute the controller-executable instruction sets stored in the memory 114. Alternatively, instructions for the method 200 may be recorded in the central memory M and executed by the central processor P.

Referring to FIG. 1, the vehicle 12 includes a plurality of sensors S operatively connected to the vehicle 12 and configured to generate respective sensor data for communication to the control center C. Referring to FIG. 1, the plurality of sensors S may include a steering angle sensor 30 configured to communicate a steering position or angle of the steering unit 19. The plurality of sensors S may include an inertial sensor 31 configured to obtain acceleration data of the vehicle 12 in a plurality of directions, for example acceleration along a vertical direction, a side-to-side direction and a front-to-back direction relative to the vehicle 12. The inertial sensor 31 may include one or more accelerometers and one or more gyroscopes to determine linear acceleration and rotational rates, respectively. The inertial sensor 31 may include a magnetometer or other component available to those skilled in the art. For example, the inertial sensor 31 may include a respective accelerometer, gyroscope, and magnetometer (not shown) per axis for a pitch axis, a roll axis and a yaw axis.

Referring to FIG. 1, the plurality of sensors S may include a navigation sensor 32, which may be a global positioning satellite (GPS) sensor, configured to obtain location coordinates or location coordinates of the vehicle 12, such as for example, latitude and longitude values. The plurality of sensors S may include an imaging unit 34, which may be a visual camera or a radar unit (short and long range). The imaging unit 34 may be configured to employ LIDAR or other imaging modalities available to those skilled in the art. The plurality of sensors S may include an acoustics sensor 36, at least one tire pressure sensor 38 and at least one wheel speed sensor 40. The plurality of sensors S may include a suspension height sensor 42 configured to detect a suspension height of the vehicle 12, a motor position sensor 44 and a motor current sensor 46 for sensing the position and current of a motor (not shown), respectively. Referring to FIG. 1, the plurality of sensors S may include a perception sensor 48 configured to synthesize perception information, such as for example, information on road conditions or roadside situations, from various sources, including a remote server 50 and/or a cloud unit 52.

Referring to FIG. 1, the control center C may be configured to communicate with the remote server 50 and the cloud unit 52, via a wireless network 54. The remote server 50 may be a public or commercial source of information available to those skilled in the art. The vehicle 12 may be configured to receive and transmit wireless communication to the remote server 50 through a mobile application 56, shown in FIG. 1. The mobile application 56 may be built into and run on an infotainment system of the vehicle 12. The perception sensor 48 may be configured to receive vehicle-to-vehicle communication via the mobile application 56. The circuitry and components of a remote server 50 and mobile application 56 ("apps") available to those skilled in the art may be employed. The mobile application 56 may be integral with, physically connected (e.g. wired) or otherwise in communication with the control center C, such that it has access to the data in the control center C.

Referring now to FIG. 2, the control center C includes a sensor data processing module 115 configured to receive the respective sensor data from the plurality of sensors S. Referring to FIG. 2, the sensor data processing module 115 feeds a fault detection module 105, the supervisory control module 100, the device controllers D and a planner module 120 (see line 126). The fault detection module 105 is configured to generate fault data indicating the occurrence of one or more faults. In other words, the fault data indicates whether a fault has occurred based on analysis of the respective sensor data and other factors. A fault detection module 105 available to those skilled in the art may be employed. The plurality of faults may include, for example, a loss of function (partial or complete) for the at least one wheel 14, at least one tire 16, the first brake unit 26, the second brake unit 27, the accelerator unit 28 and the steering unit 19.

Referring to FIG. 2, the supervisory control module 100 includes at least one fault-tolerant controller F that is configured (designed, numerically trained or otherwise adapted) to respond to the plurality of faults. The fault-tolerant controller F may utilize various strategies to control operation of the vehicle 12 upon a sudden occurrence of the at least one fault. The supervisory control module 100 is configured to employ the fault-tolerant controller F to generate at least one selected command based in part on the at least one fault, in other words, mitigate the at least one fault. The selected command is transmitted to the device controller D for delivery to at least one of the respective components of the vehicle 12. Referring to FIG. 2, the supervisory control module 100 is configured to send a supervisory command 116 to the planner module 120. The planner module 120 is configured to send control commands 122 to the device controllers D. Operation of the vehicle 12 is controlled based in part on the selected command.

Figure 3:
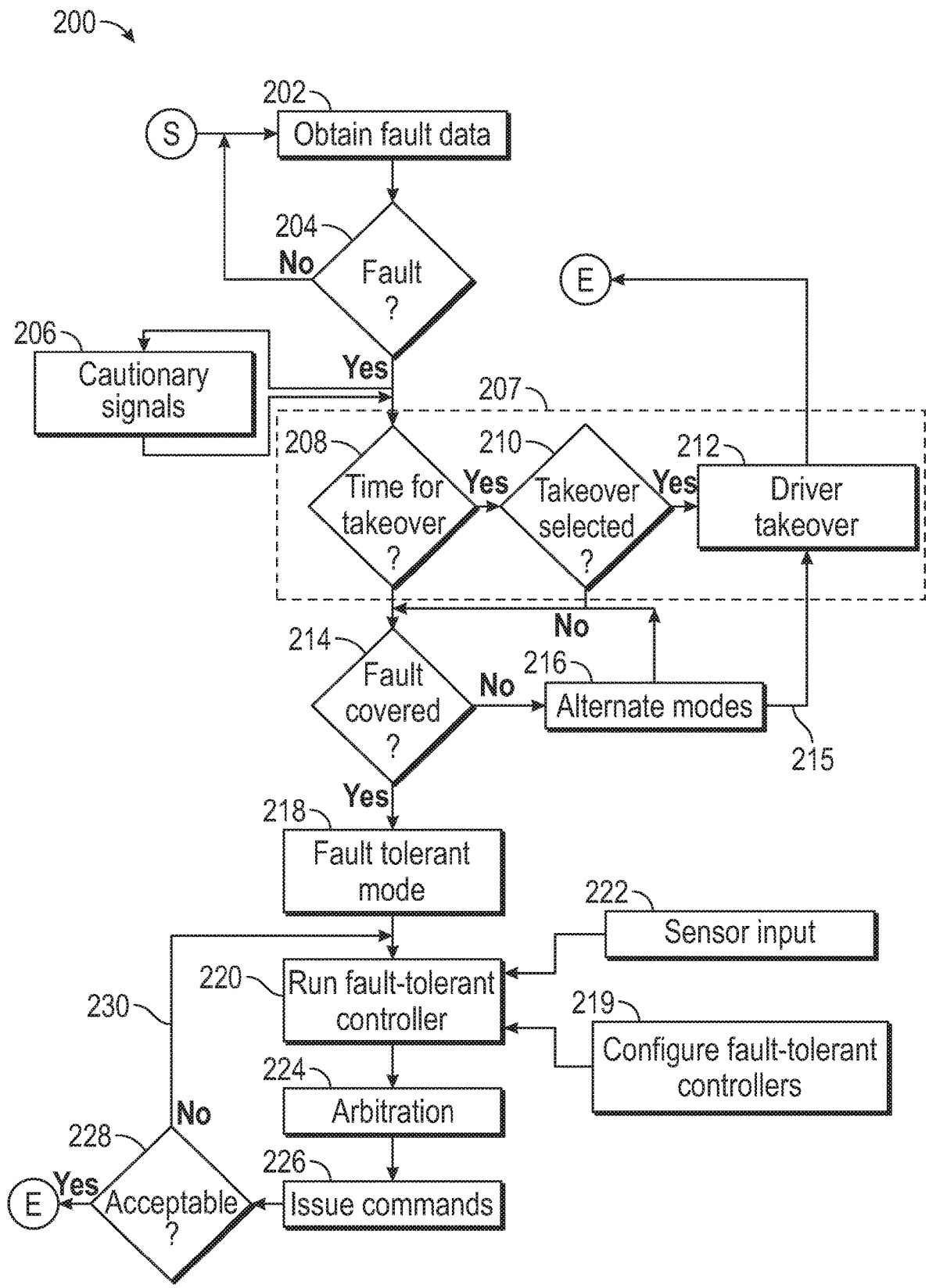
FIG. 3 is a schematic flow diagram for a method executable by the supervisory control module of FIG. 1.

Referring now to FIG. 3, a flowchart of the method 200 stored on and executable by the supervisory control module 100 of FIG. 1 is shown. Method 200 need not be applied in the specific order recited herein. Furthermore, it is to be understood that some steps may be eliminated. The start and end of the method 200 are indicated by "S" and "E," respectively. Per block 202, the supervisory control module 100 is programmed to obtain fault data from the fault detection module 105 (see FIG. 2) or another source. Per block 204, the supervisory control module 100 is programmed to determine if at least one fault from the plurality of faults is detected. If so, the method 200 proceeds to blocks 206 and 207. If not, the method 200 may be looped back to block 202. The method 200 may be programmed to continuously check for fault data while the vehicle 12 is active.

Per block 206 of FIG. 3, the supervisory control module 100 may be programmed to employ cautionary signals, such as for example, flashing lights (not shown) on the vehicle 12, sending a diagnostic report to a fleet manager via the wireless network 54 and sending a vehicle-to-vehicle warning via the wireless network 54. The method 200 proceeds to block 207, which includes blocks 208, 210 and 212. Per block 208, the supervisory control module 100 is programmed to determine if the at least one fault detected allows sufficient time for a transition to a takeover by a user U. If so, the method 200 proceeds to block 210. If not, the method 200 proceeds to block 214.

Per block 210 of FIG. 3, the supervisory control module 100 is programmed to prompt a user U of the vehicle 12 to take over control of the operation of the vehicle 12 after the at least one fault is detected, with a maximum time for the user U to respond. Per block 210, the supervisory control module 100 is programmed to check the takeover function T (see FIG. 1) to see whether it has been pre-programmed to accept or decline the takeover. Per block 212, the supervisory control module 100 is programmed to enable transition to the takeover by the user U when the at least one fault is detected and the takeover function T is pre-programmed to accept the takeover or the user U agrees after being prompted (within a specific time-window).

If the takeover function T was pre-programmed to decline the takeover or the user U declined after being prompted, the method 200 proceeds to block 214, where the supervisory control module 100 is programmed to determine if the at least one fault is covered by the control strategies from the fault-tolerant controller F. In other words, it is determined whether the at least one fault is present in the list of the plurality of faults that the fault-tolerant controller F has been configured to respond to. If the fault has been covered, the method 200 moves to block 218. If not, the method 200 proceeds to block 216 where alternative modes of operation (such as limp-home mode or other mode restricting energy consumption and/or speed of the vehicle 12) are executed. The method 200 may be looped back to block 214 or block 212 (see line 215).

Per block 218 of FIG. 3, the supervisory control module 100 is programmed to send a supervisory command 116 (see FIG. 2) to the planner module 120 to enter a fault-tolerant mode, where user inputs are disabled. Additionally, if the vehicle 12 is an autonomous or semi-autonomous vehicle on a trajectory plan, the trajectory plan is over-ridden. Next, per block 220, the fault-tolerant controller F is executed to obtain at least one selected command. The fault-tolerant controller F may include a model-based controller $F_1$, a heuristics-based controller $F_2$, a reinforcement-learning controller $F_3$ and a machine-learning controller $F_4$. It is to be understood that the number and design of the fault-tolerant controller F may be varied based upon the application at hand. Per block 219, the fault-tolerant controller F may be configured (designed, numerically trained or otherwise adapted) to respond to the plurality of faults by a respective process, such as such for example, a first process 300 and a second process 400, described below in FIGS. 4 and 5, respectively. The fault-tolerant controller F may receive sensor input as indicated by block 222 (e.g. from the sensor data processing module 115 of FIG. 2).

Per block 224 of FIG. 3, if there are multiple fault-tolerant controllers F, the selected command may be arbitrated based on a number of factors, such as strongest statistical correlation and weight allocated to each fault-tolerant controller F. In one example, the selected command is a weighted average of a respective output of the respective control functions of the model-based controller $F_1$, the heuristics-based controller $F_2$, the reinforcement-learning controller $F_3$ and the machine-learning controller $F_4$.

Per block 226 of FIG. 3, the selected command is issued to one of the device controllers D. Referring to FIG. 2, the planner module 120 may be configured to send a control command 122 to the device controllers D for execution of the selected command. The selected command may be geared towards at least one of directional stability, roll-over prevention, contact avoidance and contact mitigation. The selected command may include a steering control command (delivered via the steering controller 18 of FIG. 1) defining a steering angle and a steering rate configured to keep the vehicle 12 in a predefined trajectory (e.g. within a lane). The selected command may include an accelerate command (delivered via the propulsion controller 24) configured to increase a speed of the vehicle 12 and a brake command (delivered via the brake controller 22) configured to slow the vehicle 12. An example of a set of selected commands delivered in sequence may include: accelerating the vehicle 12 to keep it stable, minimizing lateral disturbance, gradually slowing down the vehicle 12 and gently applying the first brake unit 26 and the second brake unit 27 after a certain speed threshold is reached.

Per block 228 of FIG. 3, the supervisory control module 100 is programmed to determine if a predefined acceptable state has been reached. If so, the method 200 is ended. If not, the method 200 proceeds to block 220, as indicated by line 230. The predefined acceptable state may include acceptable ranges for speed, lateral acceleration, yaw angle, yaw rate, pitch angle, pitch rate, roll angle. For example, the predefined acceptable state may be zero speed, zero yaw and zero yaw rate. The model-based controller $F_1$ (see FIG. 2) may be characterized by (or generate the selected command based on) a first dynamic equation ($I\ddot{\psi}$=N+B), and a second dynamic equation ($a\psi+\dot{\psi}$=0). Here N is a torque acting on the vehicle 12 due to tire and road interactions, B is a differential braking control input, $\psi$ is a yaw of the vehicle, $\dot{\psi}$ is a yaw rate, $\ddot{\psi}$ is a rate of change of the yaw rate, I is a moment of inertia of the vehicle and a is a positive parameter. The selected command may include a first brake pressure command ($BP_1$) and a second brake pressure command ($BP_2$) transmitted to the first braking unit 26 and the second braking unit 27, respectively. The differential braking control input (B) from the first dynamic equation is defined as a difference between the first brake pressure command ($BP_1$) and the second brake pressure command ($BP_2$).

The heuristics-based controller $F_2$ (e.g. based on fuzzy logic) may be characterized by a membership function configured to map each point in an input space to a respective membership value between 0 and 1. The input space is at least one of a steering angle, a steering rate and a speed of the vehicle 12. In one example, the membership function is a Gaussian function. In another example, the membership function is a Poisson function. As understood by those skilled in the art, fuzzy machine learning or optimization procedures may be employed to determine the membership function and the rules selected. An example rule may be:

Rule i: if $x_1$ is $A_1$ and $x_2$ is $A_2$ and ... and $$x_n \text{ is } A_n, \text{ then } y_i = B_i, y = \frac{\sum_{i=1}^{n} \mu_i B_i}{\sum_{i=1}^{n} \mu_i}.$$

Here $x_i$ may be a yaw, yaw rate an error in yaw, a tire pressure or other signal, $y_i$ is the selected command (such as a steering angle, a braking force or acceleration force), $A_i$ and $B_i$ are fuzzy sets and $\mu_i$ is the membership function of rule i.

The reinforcement-learning controller $F_3$ may be characterized by an action-value function Q(a,s), where a is an available action for the vehicle, s is an observed state of the vehicle and the action-value function Q(a,s) indicates an estimated value of the available action a considering or based in part on a potential sequence of events (which may include subsequent actions and device reactions) occurring after the available action a is taken. The action-value function Q (a,s) having the value for each observed state is utilized to generate the selected command.

The machine-learning controller $F_4$ may be characterized by a numerical model obtained by collecting user behavior data and vehicle dynamics data with an expert user driving the vehicle 12 with the at least fault. The numerical model may be derived from the vehicle dynamics data and the user behavior data, as the vehicle dynamics data is the input to the numerical model and the user behavior data is the output of the numerical model. The user behavior may include a pattern of steering, accelerating and braking. The vehicle dynamics may include a steering angle, vehicle speed, linear acceleration and rotational acceleration in multiple directions. The machine-learning controller $F_4$ may be characterized by a support vector machine (SVM) regression defining a control function as f(x)=w·φ(x)+b. Here f(x) is a cost function for each observed state of the vehicle, φ(x) is a selected action, and w, b are parameters obtained by solving the following optimization problem to construct the maximum-margin hyper-plane in $\mathcal{H}$:

$$\min_{w,b,\xi} \frac{1}{2} w^T w + C \sum_{i=1}^{l} \xi_i,$$

subject to $|y_i - (w^T \phi(x_i) + b)| \le \varepsilon_i, \varepsilon_i \ge 0, i = 1, \ldots, l$ Here C is a given cost parameter to control the penalty of classification error, ξ is a slack variable which is the distance between $x_i$ and the hyperplane, $y_i$ is the action of an experienced driver when $x_i$ is observed and l is the number of featured data points.

Figure 4:
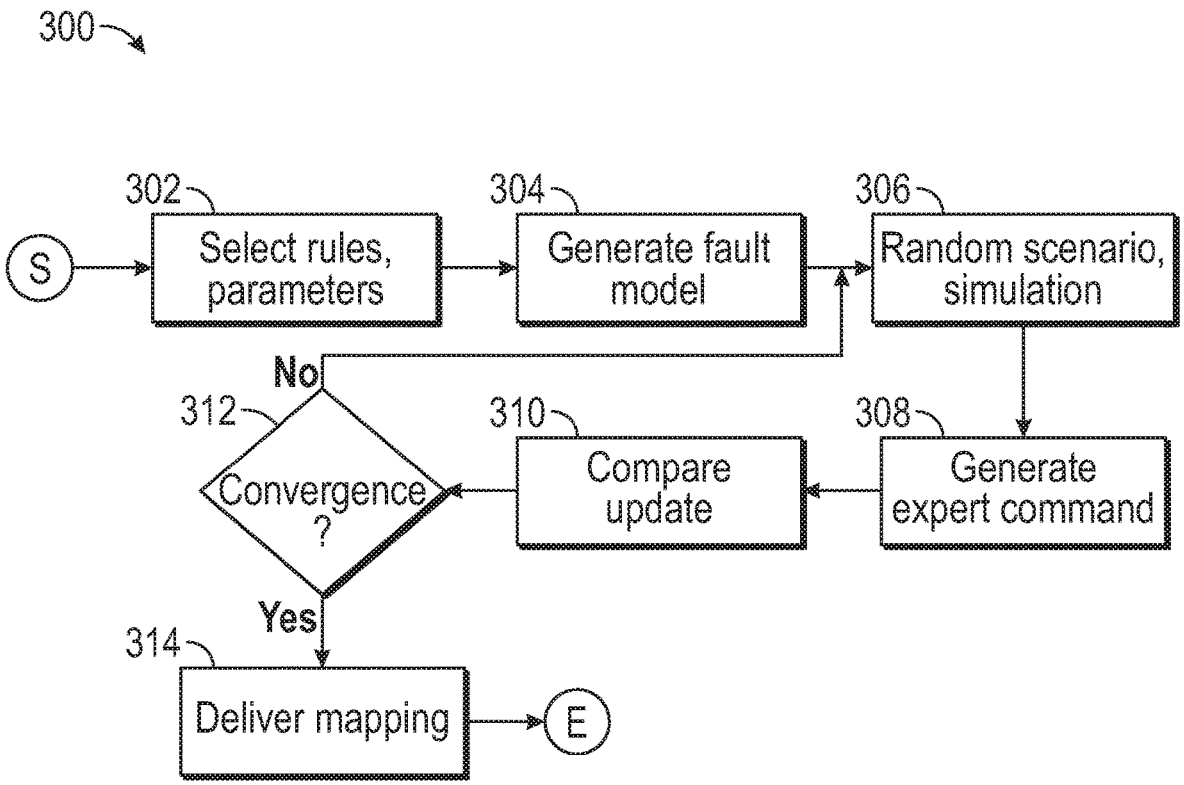
FIG. 4 is a schematic flow diagram for a first process for configuring the fault-tolerant controller of FIG. 1.
Figure 5:
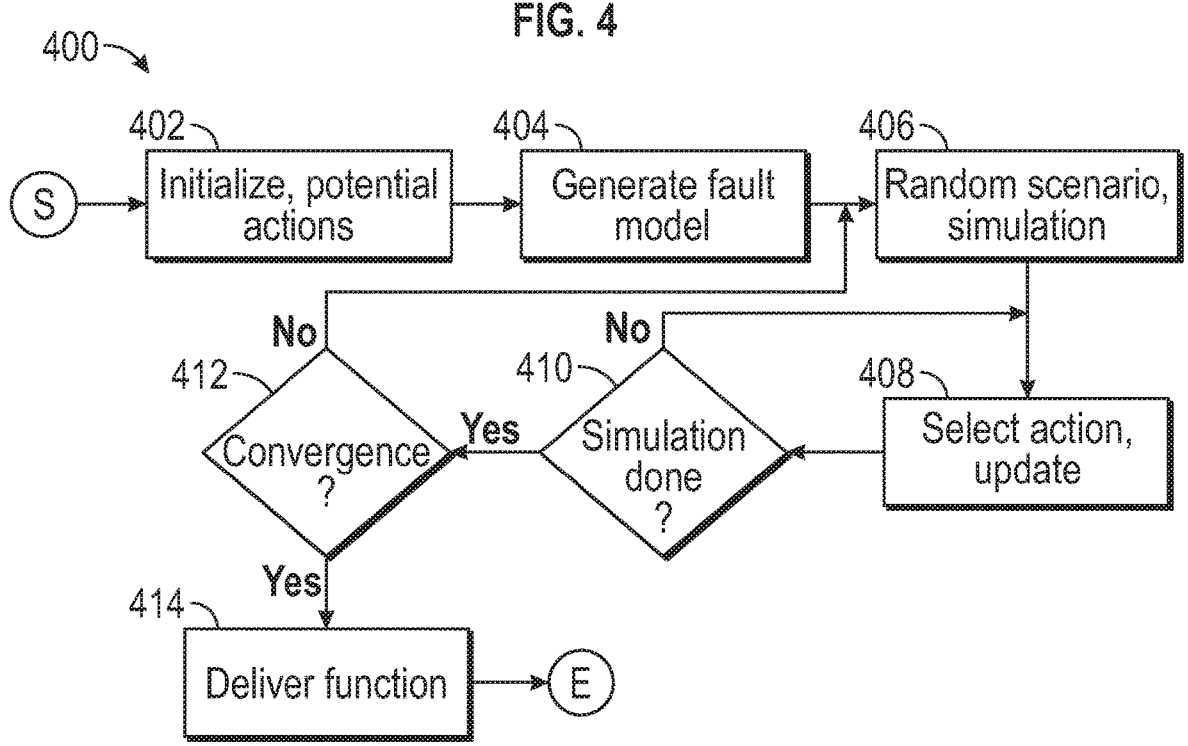
FIG. 5 is a schematic flow diagram for a second process for configuring the fault-tolerant controller of FIG. 1.

Referring now to FIGS. 4 and 5, examples of the first process 300 and the second process 400 are respectively described. The first process 300 and the second process 400 may be executed or conducted offline, before being deployed into the supervisory control module 100, e.g. before the vehicle 12 is delivered to the customer. Additionally, the first process 300 and the second process 400 may be executed by the supervisory control module 100 or by another module in the control center C. Referring to FIG. 4, the first process 300 may begin with block 302 where a membership function is selected as well as a plurality of parameters to be optimized for each of the plurality of faults. Per block 304, the supervisory control module 100 (or offline computer executing) is programmed to generate a vehicle model with the at least one fault. Per block 306, a random driving scenario is selected and numerical simulations begun. Per block 308, an expert control command is generated, i.e., mapping from observations to the control command. This may be done with a human expert using a high-fidelity simulator available to those skilled in the art or a computer numerical solution using the high-fidelity simulator. Per block 310, the expert control commands and results are compared and the parameters to be optimized are updated. Per block 312, the supervisory control module 100 (or offline computer executing) is programmed to determine if the parameters converge. If so, the control mapping is delivered from observation and saved in the memory 114 or central memory M, per block 314. If not, the first process 300 loops back to block 306.

Referring to FIG. 5, the second process 400 may begin with block 402, where rewards and/or penalty for each observed state are initialized. Per block 404, the supervisory control module 100 (or offline computer executing) is programmed to generate a vehicle model with the at least one fault. Per block 406, a random driving scenario is selected and numerical simulations begun. Per block 408, for each time step, an available action a is selected such that the action-value function Q(a,s) is maximized. The action-value function Q(a,s) is updated for each timestep. Per block 410, the supervisory control module 100 (or offline computer executing) is programmed to determine if the numerical simulation is completed. Per block 412, it is determined if Q(a,s) has converged. If so, the function Q (a,s) associated with each of the plurality of faults is saved in the memory 114 or central memory M, per block 414. If not, the second process 400 loops back to block 406.

The control center C and/or supervisory control module 100 include a computer-readable medium (also referred to as a processor-readable medium), including a non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which may constitute a main memory. Such instructions may be transmitted by one or more transmission media, including coaxial cables, copper wire and fiber optics, including the wires that comprise a system bus coupled to a processor of a computer. Some forms of computer-readable media include, for example, a floppy disk, a flexible disk, hard disk, magnetic tape, other magnetic media, a CD-ROM, DVD, other optical media, punch cards, paper tape, other physical media with patterns of holes, a RAM, a PROM, an EPROM, a FLASH-EEPROM, other memory chips or cartridges, or other media from which a computer can read.

Look-up tables, databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data stores may be included within a computing vehicle employing a computer operating system such as one of those mentioned above, and may be accessed via a network in one or more of a variety of manners. A file system may be accessible from a computer operating system, and may include files stored in various formats. An RDBMS may employ the Structured Query Language (SQL) in addition to a language for creating, storing, editing, and executing stored procedures, such as the PL/SQL language mentioned above.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A system for controlling operation of a vehicle in real-time, the system comprising:
at least one device controller operatively connected to the vehicle and configured to deliver a respective command signal to respective components of the vehicle;
a plurality of sensors operatively connected to the vehicle and configured to generate respective sensor data;
a fault detection module configured to generate fault data from the respective sensor data;
a supervisory control module in communication with the at least one device controller and having at least one fault-tolerant controller configured to respond to a plurality of faults;
wherein the supervisory control module includes a processor and tangible, non-transitory memory on which instructions are recorded, execution of the instructions by the processor causing the supervisory control module to:
receive the fault data and determine if at least one fault is detected from the plurality of faults;
when the at least one fault is detected, employ the at least one fault-tolerant controller to generate at least one selected command based in part on the at least one fault;
transmit the at least one selected command to the at least one device controller for delivery to at least one of the respective components; and
control operation of the vehicle based in part on the at least one selected command; and
wherein the at least one fault-tolerant controller includes a reinforcement-learning controller at least partially characterized by an action-value function $Q(a,s)$, where a is an available action for the vehicle, s is an observed state of the vehicle and the action-value function $Q(a,s)$ indicates an estimated value of the available action a based in part on a potential sequence of events occurring after the available action a is taken.

2. The system of claim 1, wherein:
the plurality of sensors includes an inertial sensor, an imaging unit, a navigation sensor, a tire pressure sensor and a wheel speed sensor.

3. The system of claim 1, wherein:
the respective components include at least one tire, at least one wheel, a brake unit, an accelerator unit and a steering unit; and
the plurality of faults includes a respective loss of function of the at least one tire, the at least one wheel, the brake unit, the accelerator unit and the steering unit.

4. The system of claim 3, wherein the at least one selected command includes at least two of:
a steering control command defining a steering angle and a steering rate configured to keep the vehicle in a predefined trajectory;
an accelerate command configured to increase a speed of the vehicle; and
a brake command configured to slow the vehicle.

5. The system of claim 1, wherein:
the supervisory control module is programmed to prompt a user of the vehicle to take over control of the operation of the vehicle within a predefined time period after the at least one fault is detected.

6. The system of claim 1, wherein:
the vehicle includes a takeover function pre-programmed to accept or decline a takeover of the operation of the vehicle by a user; and
the supervisory control module is programmed to enable transition to the takeover by the user when the at least one fault is detected and the takeover function is pre-programmed to accept the takeover.

7. The system of claim 1, wherein the at least one fault-tolerant controller includes:
a model-based controller characterized by a first dynamic equation ($I\ddot{\psi}=N+B$), and a second dynamic equation ($a\psi+\dot{\psi}=0$);
wherein N is a torque acting on the vehicle due an interaction with a road surface, B is a differential braking control input, $\psi$ is a yaw of the vehicle, $\dot{\psi}$ is a yaw rate, $\ddot{\psi}$ is a rate of change of the yaw rate, I is a moment of inertia of the vehicle and a is a positive parameter; and the at least one selected command includes a first brake pressure command ($BP_1$) and a second brake pressure command ($BP_2$), the differential braking control input being a difference between the first brake pressure command ($BP_1$) and the second brake pressure command ($BP_2$).

8. The system of claim 1, wherein:

the at least one fault-tolerant controller includes a model-based controller, a heuristics-based controller, a reinforcement-learning controller and a machine-learning controller;

the at least one fault-tolerant controller is configured to respond to the plurality of faults by a respective process; and the at least one selected command is a weighted average of a respective output of the model-based controller, the heuristics-based controller, the reinforcement-learning controller and the machine-learning controller.

9. The system of claim 1, wherein the at least one fault-tolerant controller includes:

a heuristics-based controller at least partially characterized by a membership function configured to map each point in an input space to a respective membership value between 0 and 1, the input space being at least one of a steering angle, a steering rate and a speed of the vehicle.

10. The system of claim 1, wherein:

the at least one fault-tolerant controller includes a machine-learning controller at least partially characterized by a numerical model; and the numerical model is generated by collecting user behavior data and vehicle dynamics data with an expert user driving the vehicle with the at least fault, the vehicle dynamics data being an input of the numerical model and the user behavior data being an output of the numerical model.

11. A method for controlling operation of a vehicle in real-time, the vehicle having at least one device controller, a plurality of sensors and a supervisory control module with a processor and tangible, non-transitory memory, the method comprising:

generating respective sensor data via the plurality of sensors;

configuring a fault detection module to generate fault data from the respective sensor data;

configuring the supervisory control module with at least one fault-tolerant controller configured to respond to a plurality of faults;

including a reinforcement-learning controller in the at least one fault-tolerant controller, the reinforcement-learning controller being at least partially characterized by an action-value function Q(a,s), wherein a is an available action for the vehicle, s is an observed state of the vehicle and the action-value function Q(a,s) indicates an estimated value of the available action a based in part on a potential sequence of events occurring after the available action a is taken;

receiving the fault data and determining if at least one fault is detected from the plurality of faults, via the supervisory control module;

when the at least one fault is detected, employing the at least one fault-tolerant controller to generate at least one selected command based in part on the at least one fault;

transmitting the at least one selected command to the at least one device controller for delivery to at least one respective component of the vehicle; and controlling operation of the vehicle based in part on the at least one selected command.

12. The method of claim 11, wherein:

the plurality of sensors include an inertial measurement unit, an imaging unit, a global positioning unit, a tire pressure sensor and a wheel speed sensor;

the respective component includes at least one tire, at least one wheel, a brake unit, an accelerator unit and a steering unit; and the plurality of faults includes a respective loss of function of the at least one tire, the at least one wheel, the brake unit, the accelerator unit and the steering unit.

13. The method of claim 12, wherein the at least one selected command includes at least one of:

a steering control command defining a steering angle and a steering rate configured to keep the vehicle in a predefined trajectory;

an accelerate command configured to increase a speed of the vehicle; and a brake command configured to slow the vehicle.

14. The method of claim 11, further comprising:

pre-programming a takeover function in the vehicle to accept or decline a takeover of the operation of the vehicle by a user; and programming the supervisory control module is programmed to enable transition to the takeover by the user when the at least one fault is detected and the takeover function is pre-programmed to accept the takeover.

15. The method of claim 11, further comprising:

including a model-based controller in the at least one fault-tolerant controller, the model-based controller being at least partially characterized by a first dynamic equation ($I\ddot{\psi}=N+B$), and a second dynamic equation ($a\psi+\dot{\psi}=0$);

wherein N is a torque acting on the vehicle due an interaction with a road surface, B is a differential braking control input, $\psi$ is a yaw of the vehicle, $\dot{\psi}$ is a yaw rate, $\ddot{\psi}$ is a rate of change of the yaw rate, I is a moment of inertia of the vehicle and a is a positive parameter; and including a first brake pressure command ($BP_1$) and a second brake pressure command ($BP_2$) in the at least one selected command, the differential braking control input being a difference between the first brake pressure command ($BP_1$) and the second brake pressure command ($BP_2$).

16. The method of claim 11, further comprising:

including a model-based controller, a heuristics-based controller, a reinforcement-learning controller and a machine-learning controller in the at least one fault-tolerant controller;

training the at least one fault-tolerant controller to respond to the plurality of faults by a respective process; and obtaining the at least one selected command as a weighted average of a respective output of the model-based controller, the heuristics-based controller, the reinforcement-learning controller and the machine-learning controller.

17. The method of claim 11, further comprising:

including a machine-learning controller in the at least one fault-tolerant controller, the machine-learning controller being at least partially characterized by a numerical model; and generating the numerical model by collecting user behavior data and vehicle dynamics data with an expert user driving the vehicle with the at least fault, the vehicle dynamics data being an input of the numerical model and the user behavior data being an output of the numerical model.

18. A system for controlling operation of a vehicle in real-time, the system comprising:
   at least one device controller operatively connected to the vehicle and configured to deliver a respective command signal to respective components of the vehicle;
   a plurality of sensors operatively connected to the vehicle and configured to generate respective sensor data;
   a fault detection module configured to generate fault data from the respective sensor data;
   a supervisory control module in communication with the at least one device controller and having at least one fault-tolerant controller configured to respond to a plurality of faults;
   wherein the supervisory control module includes a processor and tangible, non-transitory memory on which instructions are recorded, execution of the instructions by the processor causing the supervisory control module to:
      receive the fault data and determine if at least one fault is detected from the plurality of faults;
      when the at least one fault is detected, employ the at least one fault-tolerant controller to generate at least one selected command based on the at least one fault;
      transmit the at least one selected command to the at least one device controller for delivery to at least one of the respective components; and
      control operation of the vehicle based in part on the at least one selected command;
   wherein the at least one fault-tolerant controller includes a model-based controller, a heuristics-based controller, a reinforcement-learning controller and a machine-learning controller, the at least one fault-tolerant controller being configured to respond to the plurality of faults by a respective process; and
   wherein the at least one selected command is a weighted average of a respective output of the model-based controller, the heuristics-based controller, the reinforcement-learning controller and the machine-learning controller.

* * * * *